United States Patent [19]

Matz

[11] Patent Number: 5,168,755
[45] Date of Patent: Dec. 8, 1992

[54] ADAPTER FOR MOUNTING DEMOUNTABLE RIM WHEELS ON BALANCING MACHINES

[76] Inventor: David O. Matz, 93 E. Scott St., Fond du Lac, Wis. 54935

[21] Appl. No.: 629,151

[22] Filed: Dec. 18, 1990

[51] Int. Cl.⁵ ............................................. G01M 1/02
[52] U.S. Cl. .................................................... 73/487
[58] Field of Search ........................ 73/484, 485, 487; 157/16, 17

[56] References Cited

U.S. PATENT DOCUMENTS

| | | |
|---|---|---|
| 97,115 | 11/1869 | Place . |
| 1,008,652 | 11/1911 | Kremer . |
| 1,194,967 | 8/1916 | De Mattia . |
| 1,225,593 | 5/1917 | De Mattia . |
| 2,197,808 | 4/1940 | Mason . |
| 2,351,355 | 6/1944 | Merrett . |
| 2,764,194 | 9/1956 | Schultz . |
| 3,143,327 | 8/1964 | Watt . |
| 3,203,255 | 8/1965 | Rexroat ............................ 73/485 |
| 3,818,968 | 6/1974 | Hogg . |
| 4,455,731 | 6/1984 | Morgan . |

FOREIGN PATENT DOCUMENTS

| | | |
|---|---|---|
| 686977 | 2/1953 | United Kingdom . |
| 687779 | 2/1953 | United Kingdom . |
| 746520 | 3/1956 | United Kingdom . |

Primary Examiner—John E. Chapman
Attorney, Agent, or Firm—Haugen and Nikolai

[57] ABSTRACT

An adapter for allowing tires with demountable rims to be checked for balance on computerized dynamic test equipment comprises an annular plate having a central opening adapted to fit onto the cone of a dynamic balancer, the plate incorporating a cam actuated self-centering mechanism and clamping lugs for securing the plate following the centering operation to the front edge surface of the demountable rim.

7 Claims, 2 Drawing Sheets

ADAPTER FOR MOUNTING DEMOUNTABLE RIM WHEELS ON BALANCING MACHINES

BACKGROUND OF THE INVENTION

I. Field of the Invention

This invention relates generally to apparatus for allowing vehicle tires with demountable rims to be mounted on tire test equipment, such as wheel balancing equipment, and more particularly to an improved adapter having a self-centering mechanism incorporated therein and an improved clamping structure allowing the adapter to be mated with the exposed front edge surface of the demountable rim.

II. Discussion of the Prior Art

One type of wheel rim often used on large semi-trailer trucks is a so-called demountable rim, also sometimes referred to as a Dayton# rim. A cross-section of such a rim is illustrated in FIG. 1 and identified by the numeral 10. It is characterized by the fact that it does not have a central hub with bolt holes through which bolts or studs may pass for mounting the wheel to the vehicle. Instead, it is to be used with a cast spoke wheel. Because it does not include a center hub, a demountable rim wheel cannot be directly mounted on the spindle cone of a conventional dynamic wheel balancer. Thus, an adapter must be provided.

Referring to FIG. 1, there is shown a prior art adapter used for many years over which the present invention is deemed to be an improvement. It includes a tapered peripheral surface at its edge 12 which must be mated with a correspondingly tapered surface 14 formed just beneath the bead seat surface 16 of the rim 10 when inserted through the rear of the rim and pushed forward toward the front opening of the rim. The adapter 11 includes a central opening 18 which is arranged to mate with the slanting surface 20 of the spindle cone 22. The spindle cone screws onto a shaft 24 which is generally disposed in a horizontal position and which is driven at relatively high speeds during the dynamic balancing operation.

A primary problem with the prior art adapter 11 shown in FIG. 1 is the difficulty in accurately centering the adapter relative to the rim 10 which it is intended to support. Unless precise centering is accomplished, true balancing cannot be expected. The centering is made difficult because there is a range of angular tilt which is experienced as the ramp 12 on the adapter abuts the ramp 14 on the rim 10. When an operator thinks he has the adapter properly centered relative to the rim, he then assembles the clamping lug 26 on the threaded stud 28 and tightens down the hex nuts 30. This operation can also result in shifting of the rim relative to the adapter. If it is determined during the balancing test phase that the rim/adapter are not properly centered, the operator must again back off the clamping nuts 30 and attempt to precisely locate the adapter relative to the surface with which it mates on the rim. This becomes a hit-or-miss process and may take as long as 20 to 30 minutes to accomplish.

OBJECTS

It is accordingly a principal object of the present invention to provide an improved adapter for facilitating the mounting of a demountable rim on a tire balancing machine in a fast and sure manner.

Another object of the invention is to provide an adapter of the type described which includes a self-centering mechanism which insures that the balancer spindle will be exactly centered with respect to the rim.

Yet another object of the invention is to provide an adapter of the type described which can be precisely positioned and secured to a demountable rim in a matter of only a few minutes.

Still another object of the invention is to provide an adapter of the type described which, in use, is clamped to a front edge surface of the rim following the self-centering adjustment thereof.

SUMMARY OF THE INVENTION

The foregoing features, objects and advantages of the invention are achieved by providing an adapter for supporting a demountable rim and tire on a cone spindle of a balancing machine in which the adapter comprises an annular plate casting having a plurality of regularly spaced arms projecting from the periphery thereof, the arms including L-shaped recesses to define accurate perpendicular surfaces and clamping lugs for releasably clamping the annular plate to a front edge surface of the demountable rim. The self-centering means includes a plurality of centering rods (one associated with each of the arms) which are slidingly received in radial bores formed in the annular plate and which extend through the arms into the L-shaped notches. A circular cam plate having a plurality of arcuate notches is disposed centrally in the annular plate and the centering rods are coupled to the cam plate such that rotation of the cam plate causes equal radial displacements of the centering rods within their respective bores. Thus, by merely laying the adapter of the present invention on the front edge surface of the demountable rim, such that a peripheral edge of the rim fits within the L-shaped notches and then rotating the cam plate, the adapter is forced into a centrally disposed position within the opening of the rim. Now, by rotating the clamping bolts associated with each of the arms, the adapter is fixedly secured to the rim with the central opening of the adapter precisely aligned with the center of the rim.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which.

DESCRIPTION OF THE PREFERRED EMBODIMENT

Figure 2:
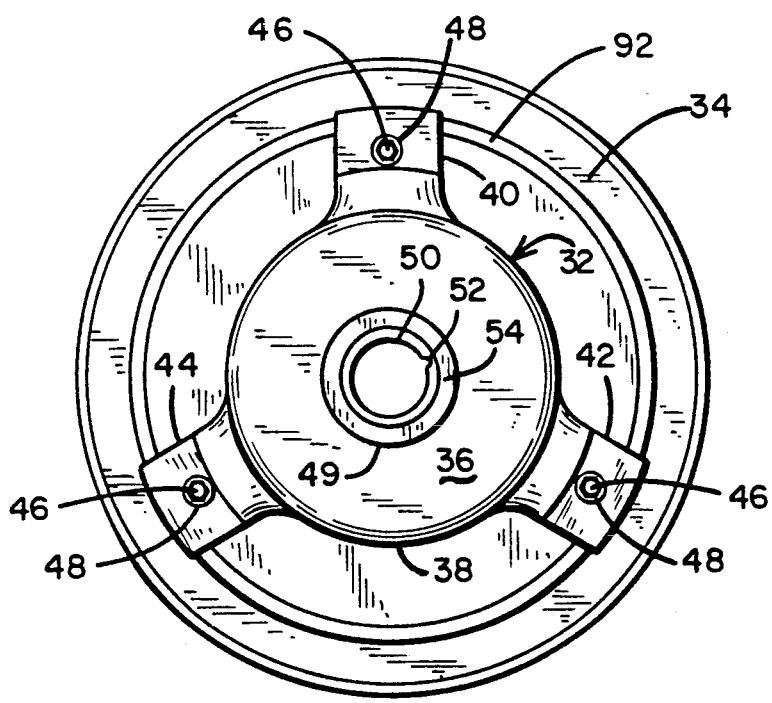
FIG. 2 is a front view of the adapter in accordance with the present invention.

FIG. 2 is a front elevation showing the adapter of the present invention attached to a demountable rim. The adapter is identified generally by numeral 32 while the demountable rim is identified by numeral 34. The adapter includes a generally flat annular plate 36, preferably cast from aluminum, and radially projecting from the periphery 38 thereof are a plurality of radially extending arms 40, 42 and 44. In the embodiment shown in FIG. 3, there are three such arms and they are disposed at 120° intervals.

Passing through bores formed through the thickness dimension of the arms are clamping bolts 46 which also pass through flat washers 48 as shown. A hardened steel sleeve (not shown) may be placed in the bores in the arms to protect the softer aluminum from wear. The annular plate 36 has a central opening 48 and shown centrally disposed in this central circular opening is a flat cam ring 50 having a tool receiving recess 52 formed therein. Also disposed in the central opening 48 in the plate 36 and overlaying the cam ring 52 is a wear ring 54. This ring is also preferably made from hardened tool steel and its inner diameter provides the edge against which the spindle cone 22 of the balancer is pressed when the adapter is to be mounted on the balancing equipment. This tool steel ring is considerably harder than the cast aluminum and, hence, insures a longer life to the adapter.

Figure 3:
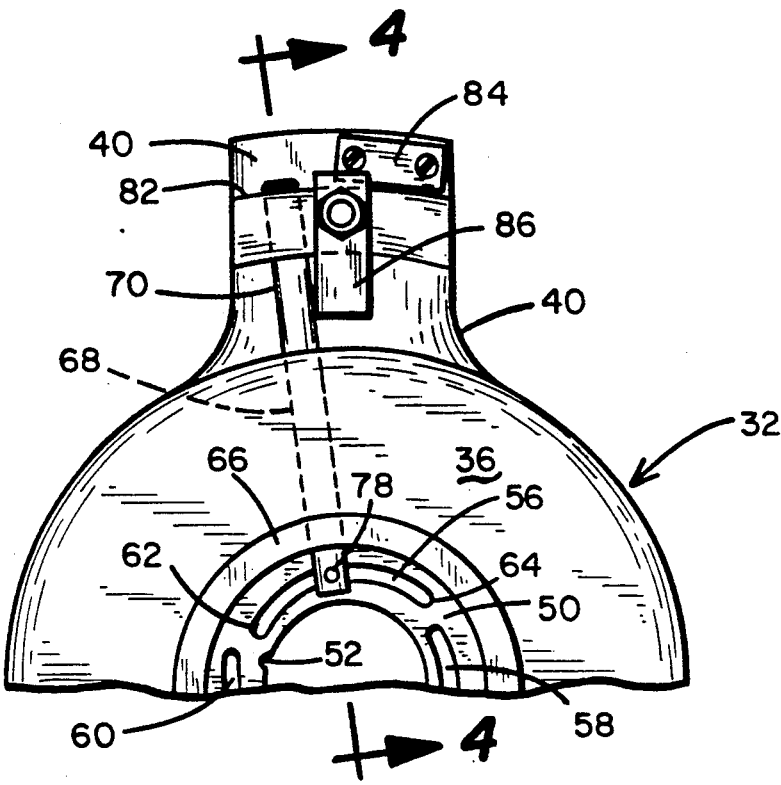
FIG. 3 is a partial rear view of the adapter of FIG. 2.

Referring next to FIG. 3, only the upper half of the adapter of FIG. 2 is shown, but from the opposite side. Because the adapter is generally symmetrical, it is felt unnecessary to show the device in its entirety in the view of FIG. 3. The cam ring 50 is seen to include three arcuate slots 56, 58 and 60. The slots are not concentric with the center of the adapter, but instead exhibit a continually increasing radius. Referring to slot 56, the radial distance is a minimum at its end 62 and a maximum at its end 64. The slots 58 and 60 are likewise configured. A protector ring 66 is disposed in parallel spaced relation with respect to the cam ring 50 and serves to shield the cam ring from damage in the event of rough handling commonly encountered in a truck tire repair facility.

Figure 4:
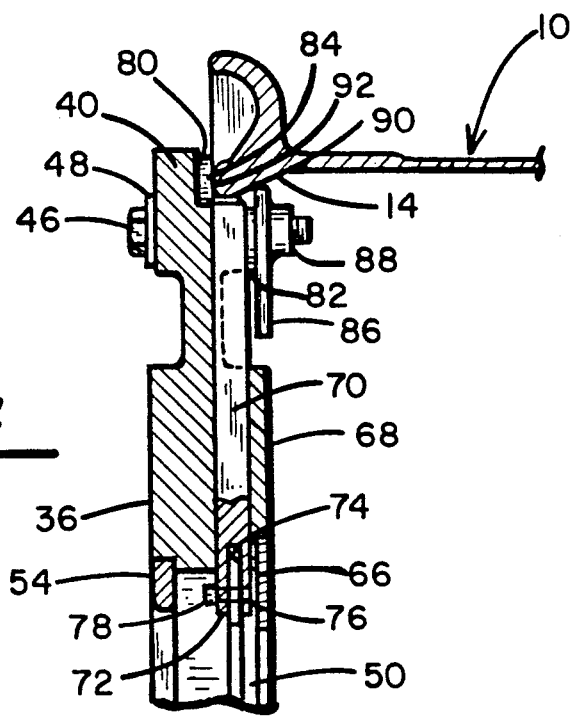
FIG. 4 is a cross-sectional view of the adapter taken along the lines 4—4 in FIG. 3 when it is assembled to a demountable rim.

With reference to the cross-sectional view of FIG. 4, it is taken along the line 4—4 in FIG. 3 and reveals the presence of a elongated cylindrical bore 68 which extends radially through the plate 36 and through a portion of the arm 40. Similar bores pass through the plate and arms 42 and 44 as well. Slidingly received within the radial extending bores in each of the arms is a centering rod, as at 70. As can best be seen in the cross-sectional view of FIG. 4, the innermost end 72 of each of the centering rods has a longitudinal slot formed therethrough as at 74. The width of the slot allows the cam ring 50 to fit therein. Drilled diametrically through the rods and intersecting the slots are bores, as at 76, for receiving a cap screw 78 which also passes through an associated arcuate slot, such as slot 56, in the case of centering rod 70.

It should be apparent to those skilled in the art that when the cam ring 50 is rotated the edges defining the respective arcuate slots 56, 58 and 60 will cooperate with the cap screws 78 to urge the centering rods radially outward when turned in a first direction and withdrawn radially inward when turned in the opposite direction. Because of the symmetry involved, each of the centering rods 70 will be moved an equal distance.

An appropriately shaped tool having an edge which can fit into the tool-receiving recess 52 can be used to facilitate the rotation of the cam ring 50 in either the clockwise or counterclockwise direction.

With continued reference to FIGS. 2 and 3, it can be seen that there is formed in the outer end of each of the arms, a L-shaped notch or recess having a radially extending wall surface 80 and an arcuate transverse wall 82 meeting it at 90°. Fastened to the wall 80 by countersunk machine screws is a protective spacer or shim 84, also preferably made from hardened steel which serves to prevent undue wear of the cast aluminum adapter plate 36. Each of the plurality of arms is equipped with one such protective spacer as well as with a clamping lug 86 which may be threaded to receive the threaded end of the clamping bolt 46 or, alternatively, as is illustrated in FIG. 4, an internally threaded hex nut 88 may be welded to the clamp lug 86 for receiving the clamping bolt 46 therein.

In use, a demountable rim 10 may be laid flat on the floor with its normal outer edge facing upward. With the cam ring 50 turned so as to fully retract the centering rods so that the end portions thereof do not extend beyond the floor surface 82 and with the clamp lug 86 turned 90° from the position illustrated, the adapter 32 may be laid on the front edge of the rim 10 in the manner shown in the cross-sectional view of FIG. 4. Now, when a special tool is used to rotate the cam ring 50 counterclockwise when viewed as in FIG. 3, each of the plurality of centering rods will be pushed radially outward equal amounts until they each engage the rounded inner surface 90 of the demountable rim. At the same time, the accurately machined outer edge surface 92 of the rim will be abutting the protective shim 84. When the cam ring has been turned sufficiently far in the counterclockwise direction so that the adapter becomes centered and fits snugly relative to the front portion of the demountable rim, the clamp lugs 86 may be rotated to the position shown in FIG. 4 and the bolts 46 tightened to engage an edge of the clamp lugs with the inclined surface 14 of the demountable rim. With all three clamping bolts 46 tightened down in this manner, the adapter 32 is securely attached to the demountable rim and it will be found that the center of the wear ring 54 (FIG. 2) will be at the precise center of the annular rim 10. The assembly can then be placed on the spindle cone of the balancer whereupon the balancing operation can be accomplished.

Figure 1:
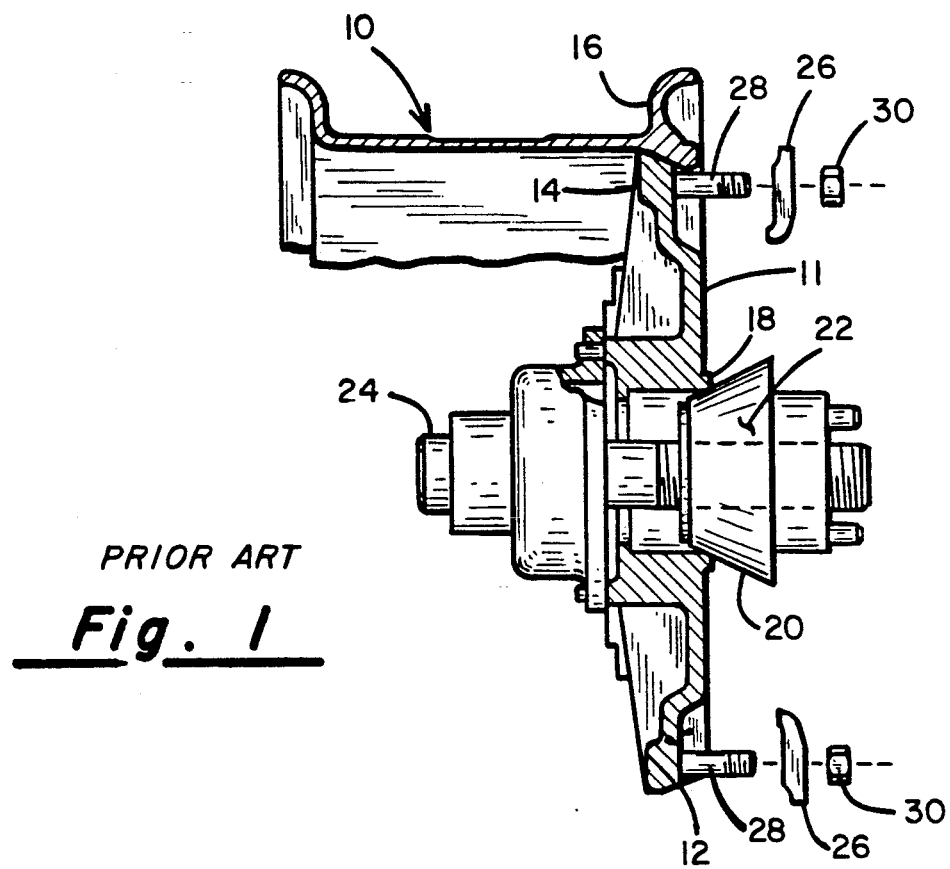
FIG. 1 is a cross-sectional view showing a prior art adapter.

The beauty of the present invention resides in the fact that the adapter built in accordance therewith can be affixed to a demountable rim and positively centered with respect to it in only a matter of a minute or two. This is to be contrasted with the 20 to 30 minutes of trial-and-error needed for mounting the prior art adapter of FIG. 1 to a rim. Furthermore, the present invention may be used with both tubeless and tube-type tires of all commonly used sizes.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A demountable rim balancer adapter comprising:
    (a) a generally planar circular plate having a concentric circular opening therein, a plurality of regularly spaced arms extending radially from the periphery of said plate, each of the arms terminating in a L-shaped notch, and radially extending bores extending from said circular opening through said arms and intersecting a first surface of said L-shaped notches;

(b) a cam ring rotatably mounted in said circular opening, the cam ring including a plurality of arcuate slots formed through the thickness dimensions thereof, said arcuate slots having opposed, lateral edge surfaces which continuously vary in distance from the center of said circular opening;

(c) a plurality of centering rods slidingly received in said bores, and operatively coupled to said arcuate slots in said cam ring such that when said cam ring is rotated in a first direction, said rods are totally withdrawn from said L-shaped notches and when rotated into the opposite direction, said centering rods extend radially an equal distance into said L-shaped notches beyond said first surface; and (d) means for clamping a demountable rim in said L-shaped notches of said arms after said cam ring has been rotated to force the outer ends of said centering rods against a predetermined edge surface of said rim.

2. The adapter as in claim 1 wherein each of said centering rods includes a slot in the inner end thereof in which said cam ring is received and a pin extending transversely through said centering rods and said arcuate slots.

3. The adapter as in claim 1 wherein said radial bores are angularly offset from the center line of said arms.

4. The adapter as in claim 1 wherein said means for clamping comprises a bolt passing through the thickness dimension of said arms and a clamping lug with a threaded bore into which said bolt passes.

5. The adapter as in claim 1 further including a protector ring fitted into said circular opening in overlaying relation relative to said cam ring.

6. The adapter as in claim 1 wherein there are three of said arms spaced at 120° C. intervals around the periphery of said circular plate.

7. A demountable rim balancer adapter for supporting a demountable rim and tire on a cone spindle of a balancing machine comprising:

(a) an annular plate having a plurality of regularly spaced arms projecting from said annular plate;

centering means including a plurality of centering rods slidingly received in radial bores formed in said annular plate and extending through said arms and a cam plate disposed in said annular plate and coupled to said centering rods for causing equal radial displacement of said centering rods when said cam plate is rotated relative to said annular plate; and (c) clamping means for releasably clamping said annular plate to a front edge surface of a demountable rim after it is centered.

* * * * *